United States Patent [19]
Yada et al.

[11] Patent Number: 5,528,868
[45] Date of Patent: Jun. 25, 1996

[54] ASSEMBLY OF A WINDSHEILD GLASS AND A WEATHER STRIP HAVING A PARTLY MODIFIED CROSS SECTION

[75] Inventors: Yukihiko Yada; Toshikazu Ito, both of Obu, Japan

[73] Assignee: Tokai Kogyo Kabushiki Kaisha, Japan

[21] Appl. No.: 413,449

[22] Filed: Mar. 30, 1995

Related U.S. Application Data

[62] Division of Ser. No. 109,449, Aug. 20, 1993, Pat. No. 5,445,780.

[30] Foreign Application Priority Data

Aug. 26, 1992 [JP] Japan ................................. 4-250545
Jul. 20, 1993 [JP] Japan ................................. 5-179324

[51] Int. Cl.$^6$ ..................................... E06B 7/23
[52] U.S. Cl. ................................. 52/208; 296/93
[58] Field of Search ........................ 52/208; 296/93, 296/208, 201

[56] References Cited

U.S. PATENT DOCUMENTS

| | | | |
|---|---|---|---|
| 4,757,659 | 7/1988 | Miyakawa et al. | 52/400 |
| 4,884,380 | 12/1989 | Yada et al. | 52/208 |
| 4,890,431 | 1/1990 | Katayama | 52/208 |
| 4,905,432 | 3/1990 | Romie | 52/208 |
| 4,916,873 | 4/1990 | Keys | 52/208 |
| 5,001,876 | 3/1991 | Harper | 52/208 |
| 5,009,462 | 4/1991 | Katcherian | 52/208 X |
| 5,112,101 | 5/1992 | Katcherian | 52/208 X |
| 5,190,338 | 3/1993 | Yada | 52/208 X |

*Primary Examiner*—Carl D. Friedman
*Assistant Examiner*—Beth A. Aubrey
*Attorney, Agent, or Firm*—Dennison, Meserole, Pollack & Scheiner

[57] ABSTRACT

In the assembly of a windshield glass and a weather strip having a partly modified cross section the weather strip is extruded along the peripheral edge of the windshield glass and fixedly adhered thereto, a movable die 132 of a die assembly is properly moved so as to change the shape of an orifice of the die assembly.

6 Claims, 16 Drawing Sheets

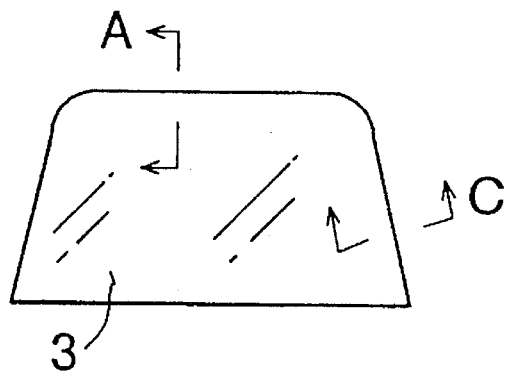
FIG.20 (A) PRIOR ART
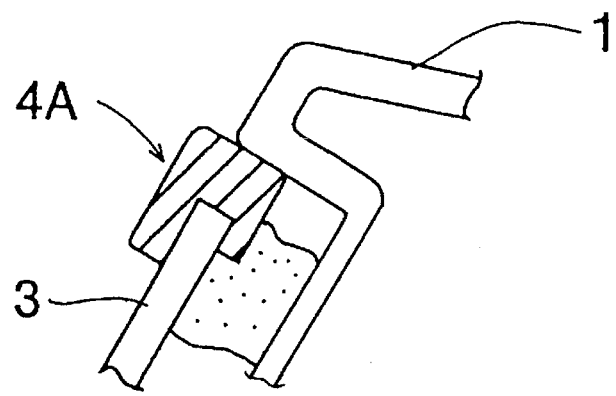
FIG.20 (B) PRIOR ART
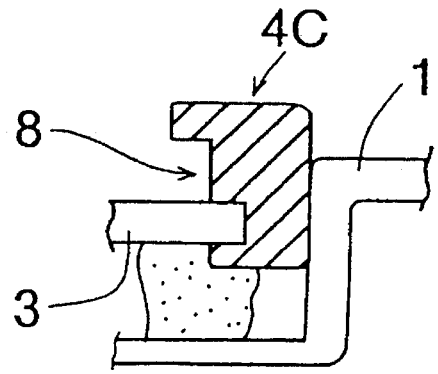
FIG.20 (C) PRIOR ART
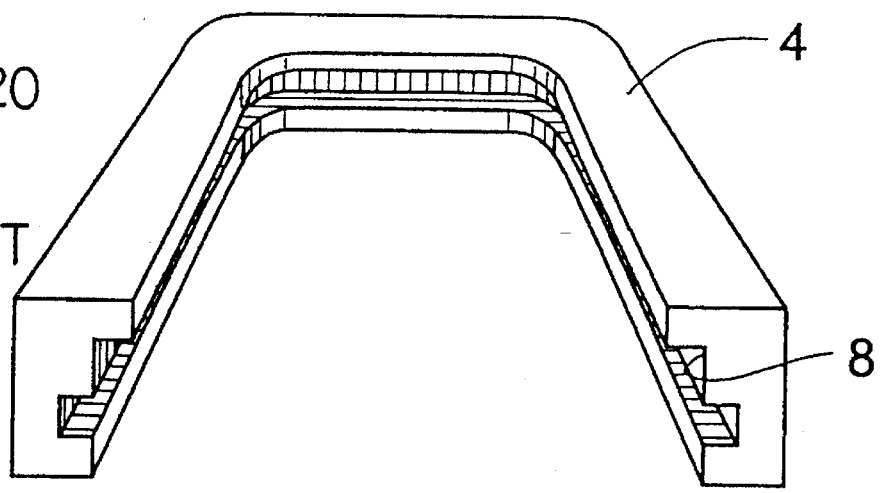
FIG.20 (D) PRIOR ART

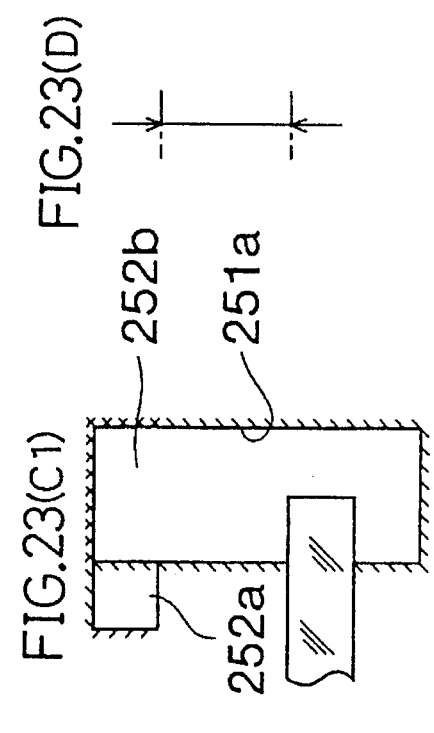
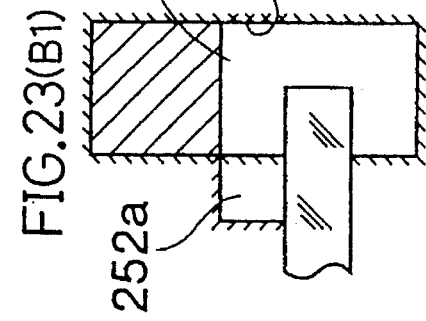
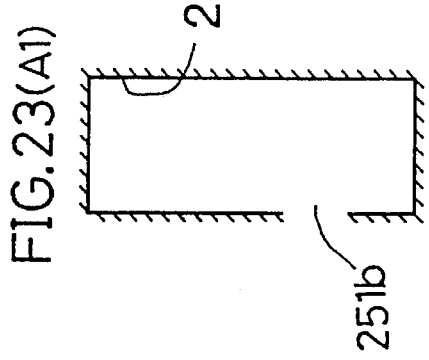
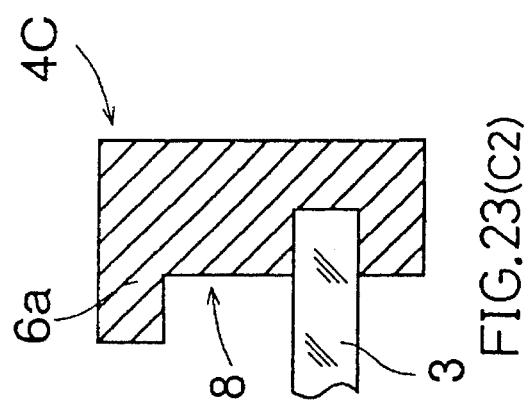
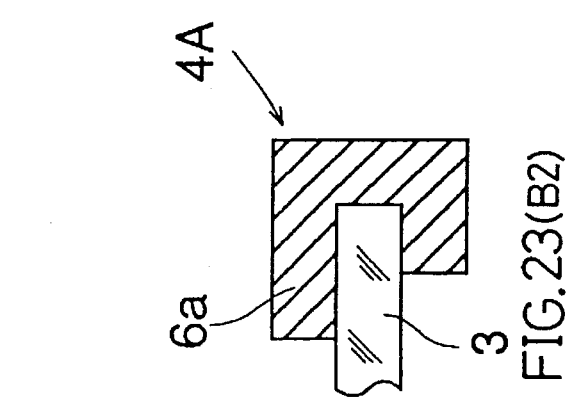
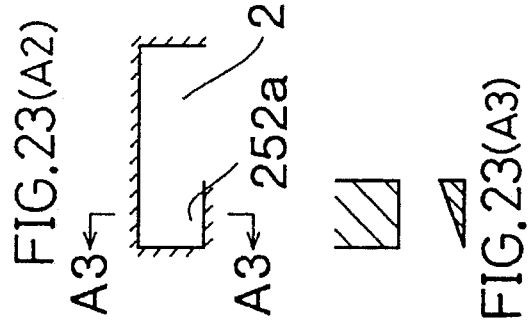

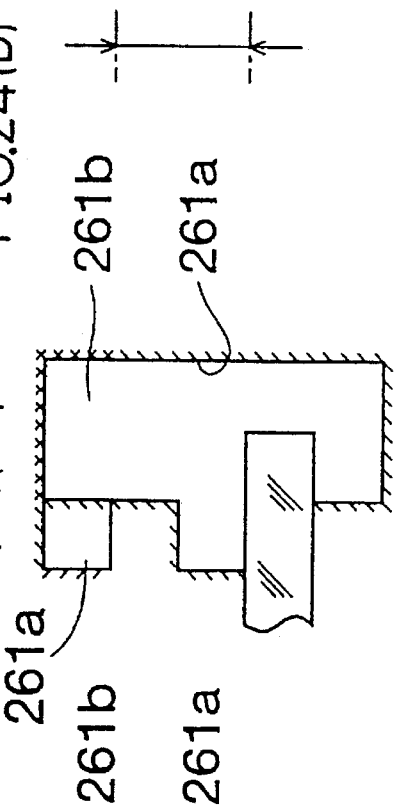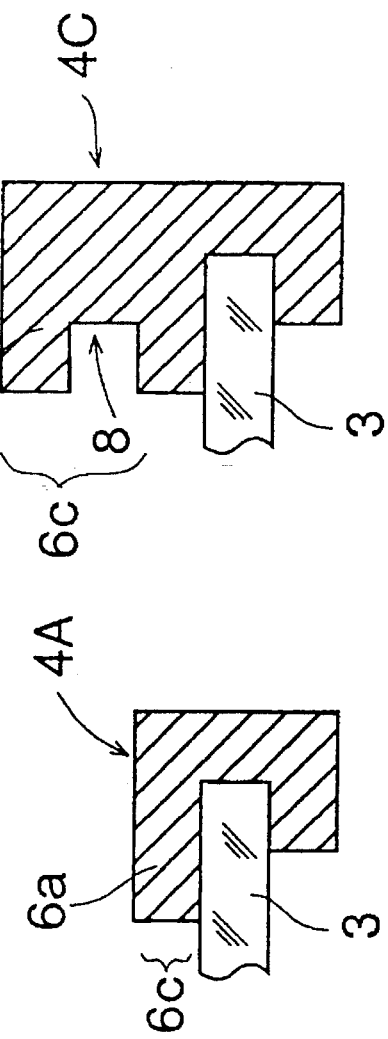

ASSEMBLY OF A WINDSHEILD GLASS AND A WEATHER STRIP HAVING A PARTLY MODIFIED CROSS SECTION

This is a division of application Ser. No. 08/109,449, filed Aug. 20, 1993 now U.S. Pat. No. 5,445,780; on Aug. 29, 1995.

BACKGROUND OF THE INVENTION

1. Field of the Invention

The present invention relates to extrusion molding of a weather strip onto the peripheral edge of a windshield glass, and specifically to extrusion molding of such a weather strip having a partly modified cross section.

2. Description of the Prior Art

As shown in FIG. 1, a weather strip 4 is provided around a windshield glass 3 of an automobile. Noting FIGS. 20(A) through 20(D), the the weather strip 4 should include an upper portion 4A and a pair of side portions 4C, the portions 4A and 4C having different cross sections from each other. Specifically, as shown in FIG. 20(C), the side portion 4C is required to have a groove 8 extending along a side edge of the windshield glass 3, while the upper portion 4A is not required to have such a groove 8, as shown in FIG. 20(B).

A technique of extruding such a weather strip 4 having a partly modified cross section is disclosed in Japanese Laid-Open Patent Publication No. 3-128721. According to this technique, as shown in FIGS. 22(A1) through 22(D2), extrusion molding is carried out by using a fixed die having an orifice 210 and a movable die having an orifice 220, the movable die being movable in relation to the fixed die. Thus, the orifices 210 and 220 overlap each other to form a portion (i.e. geometrical Boolean product) which defines a practical orifice, and a weather strip having a cross section conforming to the practical orifice in shape is extruded. For example, the orifice 210 and 220 are disposed in such a positional relationship as shown in FIG. 22(B1) to extrude a weather strip portion corresponding to the upper portion 4A which has no groove 8 adjacent to the windshield glass 3. On the contrary, the orifice 210 and 220 are disposed in such a positional relationship as shown in FIG. 22(C1) to extrude a weather strip portion corresponding to the side portion 4C which has the groove 8 adjacent to the windshield glass 3. This results in extrusion molding of the weather strip as shown in FIG. 20(D).

Though this technique is quite effective to integrally extrude such a weather strip 4 having a partly modified cross section, the weather strip 4 is molded separately from the windshield glass 3, so that the weather strip 4 thus molded must be fitted on the peripheral edge of the windshield glass 3. Disadvantageously, there will occur a problem that the weather strip 4 is apt to be twisted during the fitting process. Furthermore, the weather strip 4 may move along the peripheral edge of the windshield glass 3, that is, the upper portion 4A or the side portion 4C of the weather strip 4 may be positioned on the corner edge of the windshield glass 3, though these portions 4A, 4C should be precisely positioned on the upper edge and the side edge of the windshield glass 3, respectively.

U.S. Pat. No. 5,057,265 teaches a technique to form a windshield glass/weather strip assembly. According to the technique, as shown in FIG. 21, extrusion molding is carried out by moving a die 331 having an orifice 331a along the peripheral edge of the windshield glass 3. This assures the weather strip 4 to be extruded along the peripheral edge of the windshield glass 3, thereby to form a windshield glass/weather strip assembly. Thus, the technique can provide the weather strip directly molded on the peripheral edge of the windshield glass 3, eliminating the process of fitting the weather strip on the peripheral edge of the windshield glass 3. It should be noted that the weather strip molded in accordance with the above U.S. Pat. No. 5,057,265 has a uniform cross section. Also, weather strip 4 is formed of urethane having less weather-proof property and is mounted on only the inboard side. Further, the die 331 is moved along the peripheral edge of the windshield glass 3 while contacting therewith. Therefore, if there is a variation in the size of the windshield glass 3, the variation is directly reflected in the external size of the windshield glass/weather strip assembly.

Combination of the technique shown in FIGS. 22(A1) through 22(D2), i.e. molding by moving the movable die in relation to the fixed die so as to change the shape of the practical orifice and the technique shown in FIG. 21, i.e. extrusion molding by the die traveling along the peripheral edge of the windshield glass might be expected to provide a weather strip having a partly modified cross section and molded on the peripheral edge of the windshield glass. However, the combination of the technique shown in FIGS. 21 and FIGS. 22(A1) through 22(D2) can form only the weather strip having limited cross section.

As shown in FIG. 22(B2) and 22(C2), the weather strip 4 has on the outboard side thereof a projection 6a extending toward the center of the windshield glass 3, the projection 6a being disposed contact with the windshield glass 3 at some parts of the weather strip 4 and apart therefrom at other parts. As shown in FIG. 22(A1), the fixed die should be formed with an orifice 210 having the same width as the projection 6a and extending vertically as seen in the drawing. The movable die having an orifice 220 is vertically movable in the orifice 210 so as to change the level where the project ion 6a is formed. If the weather strip 4 is molded separately from the windshield glass 3, there would be no problem of interference between the movable die and the windshield glass 3, permitting execution of the extrusion process as shown in FIGS. 22(A1) through 22(D2). If it is, however, desired to carry out extrusion molding along the peripheral edge of the windshield glass 3, there occurs an interference between the windshield glass 3 and the movable die, which would inhibit execution of the process in FIG. 22(A1) through 22(D2). If the movable die is so designed as to avoid such interference with the windshield glass it is possible to mold a weather strip having a cross section which is partly different in thickness H (FIG. 22(D2)) but not possible to form a groove 8. In order to form the groove 8, it is required to provide the movable die with a wall for defining the groove 8 and this wall would inevitably interfere with the windshield glass.

SUMMARY OF THE INVENTION

It is an object of the present invention to solve the above problem by extrusion molding of a weather strip with a groove formed in some parts thereof on the peripheral edge of a windshield glass without any interference between a movable die and the windshield glass.

It i s another object of the present invention to provide, by the above extrusion molding process, a windshield glass assembly in which a weather strip having a groove formed in some parts thereof is directly molded onto the peripheral edge of the windshield glass.

The above objects are achieved by a method of extruding a weather strip having a partly modified cross section along the peripheral edge of a windshield glass, the method having steps of inserting the peripheral edge of the windshield glass into an orifice of a fixed die having a slot through which the peripheral edge of windshield glass is inserted, and moving, during the extrusion process, a movable die in relation to the fixed die, the movable die having an orifice wider than a portion of the orifice of the fixed die adjacent to the windshield glass, the movable die having a supplementary passage communicating with the wider portion thereof, and at the same time, moving the peripheral edge of the windshield glass in relation to the fixed die.

According to the present invention, there is provided an assembly of a windshield glass and a weather strip having a partly modified cross section, the weather strip being extruded onto the peripheral edge of the windshield glass, characterized in that the weather strip has on the outboard side thereof a projection extending toward the center of the windshield glass, the projection being in contact with the windshield glass at the upper portion of the windshield glass and being apart from the windshield glass at the side portion of the windshield glass to define a groove therebetween.

FIG. 23 (A1) shows an example of an orifice 251a of the fixed die having a slot 251b through which the windshield glass 3 is inserted. FIG. 23(A2) shows an example of an orifice of the movable die. The orifice of the movable die is composed of a portion 252b having the same width as the orifice 251a and a wider portion 252a extending laterally therefrom. A supplementary passage not shown is communicated with the wider portion 252a within the movable die.

When the fixed die and the movable die are disposed in such a positional relationship as shown in FIG. 23(B1), the resulting extruded member integrally includes a portion formed through both orifices 251a and 252b and a portion formed through the supplementary passage and then through the wider orifice portion 252a. The weather strip thus molded has a cross section as shown in FIG. 23(B2). When the fixed die and the movable die are disposed in such a positional relationship as shown in FIG. 23(C1), the resulting extruded member integrally includes a portion formed through the orifice 251a, a portion formed through both orifices 251a and 252b, and a portion formed through the supplementary passage and then through the wider orifice portion 252a. The weather strip thus molded has a cross section as shown in FIG. 23(C2). In this case, a groove 8 is defined.

Thus, this method assures extrusion molding of a weather strip along the peripheral edge of the windshield glass, having a groove formed in some parts of the weather strip without any interference between the movable die and the windshield glass, and thus an assembly of a windshield glass and a weather strip having a partly modified cross section is manufactured in accordance with the present invention.

When a modified fixed die having an orifice 261a and a movable die having orifices 262a and 262b as shown in FIGS. 24(A1) through 24(D) are used, the assembly of a windshield glass and a weather strip having a partly modified cross section is formed with a modified projection in the form of a variable thickness. lip 6c in tight contact with the surface of the windshield glass 3, the lip 6c being relatively thin at the upper portion of the windshield as shown in FIG. 24(B2) and being relatively thick at the side portion thereof as shown in FIG. 24(C2). The relatively thick portion of the lip 6c is formed with a groove 8 extending toward the center of the windshield glass 3.

The windshield glass assembly thus obtained has the weather strip attached thereto, with no necessity to attach the weather strip around the windshield glass. Furthermore, the weather strip with the groove formed in some parts thereof can satisfactorily fulfill the intended function on the weather strip.

The present invention will be more fully understood from the following detailed description and appended claims when taken with the accompanied drawings.

BRIEF DESCRIPTION OF THE DRAWINGS

FIGS. 20(A), 20(B), 20(C) and 20(D) are views illustrating a prior art;

FIGS. 23(A1), 23(A2), 23(A3), 23(B1), 23(B2), 23(C1), 23(C2) and 23(D) are schematic views illustrating an embodiment of the present invention; and FIGS. 24(A1), 24(A2), 24(A3), 24(B1), 24(B2), 24(C1), 24(C2) and 24(D) are schematic views illustrating another embodiment of the present invention.

DETAILED DESCRIPTION OF THE PREFERRED EMBODIMENTS

Figure 1:
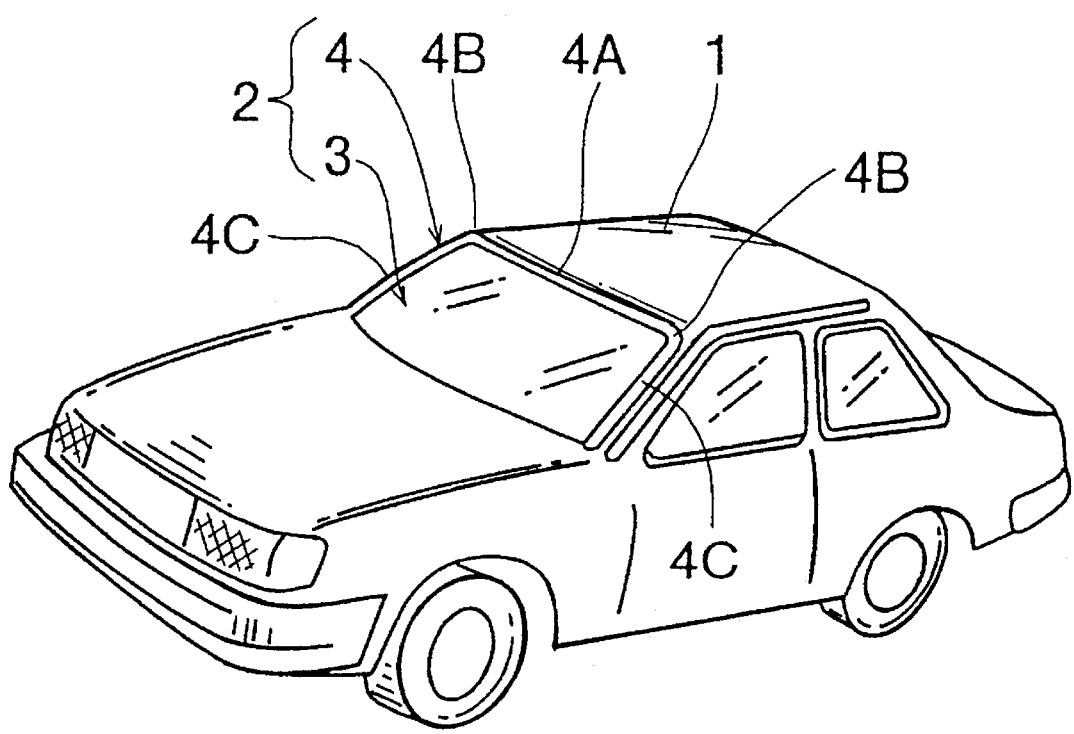
FIG. 1 is a perspective view of a whole automobile having a windshield glass/weather strip assembly attached thereto.

Referring now to FIGS. 1 to 4, an embodiment of a windshield glass/weather strip assembly formed in accordance with the present invention will be described. The following description will be related to a front windshield glass/weather strip assembly for an automobile as shown in FIG. 1.

As shown in FIG. 1 which is a perspective view of an automobile, a windshield glass/weather strip assembly 2 to be fitted in a window opening of a body panel 1 is composed of a windshield glass 3 which is formed in a curved contour in view of esthetic and aerodynamic characteristics and a weather strip 4 fixedly adhered to the peripheral edge of the windshield glass 3. The windshield glass 3 has an end surface and front and rear surfaces of the peripheral edge treated by primer, and a resin adhesive is applied on the primer-treated portions, as will be mentioned later.

The weather strip 4 is integrally adhered to the portion of the peripheral edge of the windshield glass 3 on which the adhesive is applied. The weather strip 4 is made of a synthetic resin, rubber or the like, and extruded continuously along and onto the peripheral edge of the windshield glass 3 and, at the same time, it is adhered thereto by the adhesive. Preferably, the weather strip 4 may be made of polyvinyl chloride (PVC) elastomer containing a plasticizer. The weather strip 4 is in the form of a frame along the peripheral edge of the windshield glass 3, the cross section taken in a plane vertical to the longitudinal direction being changed in the longitudinal direction. Specifically, the water strip 4 comprises an upper portion 4A fitted in a space between the upper edge of the windshield glass 3 and a roof panel, a pair of side portions 4C each fitted in a space between either side edge of the windshield glass 3 and a pillar panel, and a pair of corner portions 4B each connecting the upper portion 4A and either of the side portions 4C in a curved manner.

Figure 2:
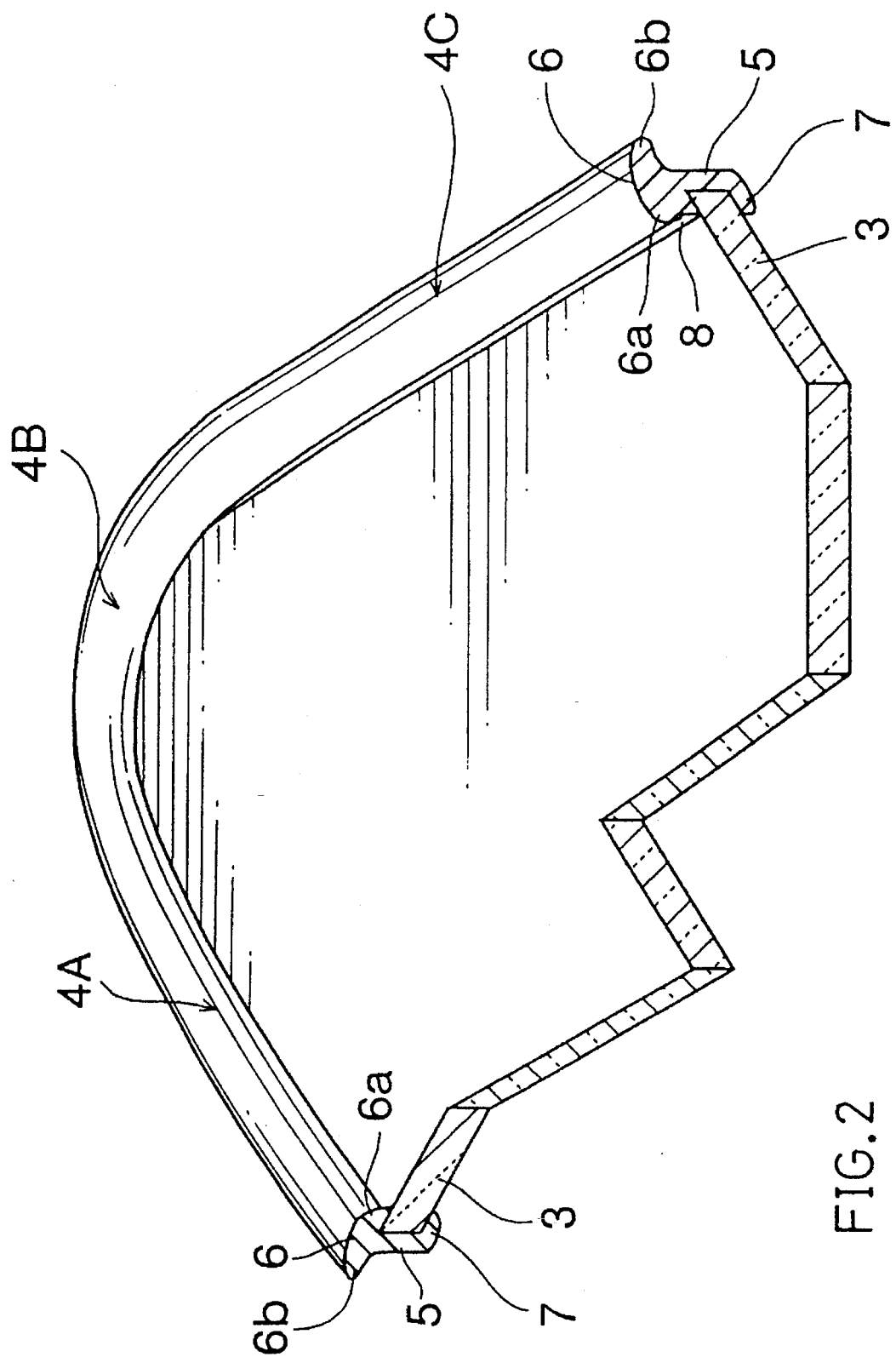
FIG. 2 is a fragmentary perspective view of the vicinity of a corner the windshield glass/weather strip assembly in FIG. 1.
Figure 3:
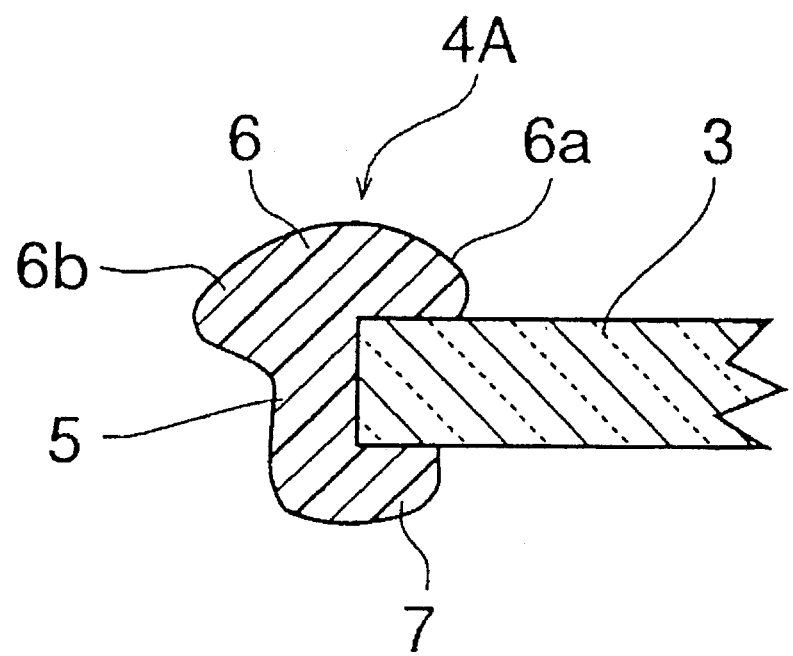
FIG. 3 is a cross section of an upper portion of the weather strip in FIGS. 1 and 2.
Figure 4:
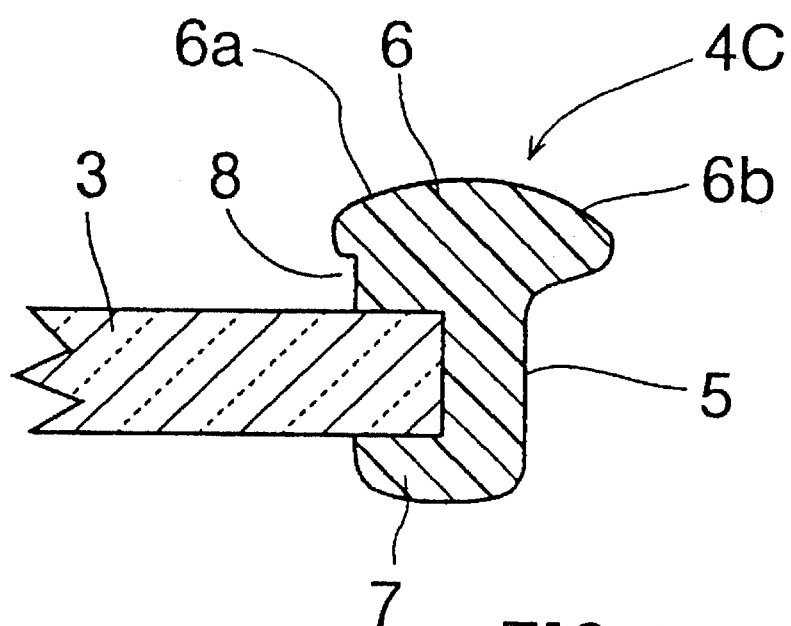
FIG. 4 is a cross section of a side portion of the weather strip in FIGS. 1 and 2.

As shown in FIGS. 2, 3 and 4, the weather strip 4 has a leg portion 5 inserted into the space between the peripheral edge of the windshield glass 3 and the body panel 1, and a trimming portion 6 extending from the outboard end (upper end in the drawing) of the leg portion 5 and adapted for covering the connection between the windshield glass 3 and the body panel 1 from outside of the body. The trimming portion 6 and the leg portion 5 define a member having a substantially T-shaped cross section taken vertically to the longitudinal direction. The leg portion 5 has at its inboard end (lower end in the drawing) a support piece 7 extending along the full length thereof and adapted for supporting the lower surface of the windshield glass 3. A glass receiving groove of a uniformly U-shaped configuration in cross section is defined between the support piece 7 and the trimming portion 6 so as to receive the windshield glass 3.

The trimming portion 6 comprises a glass-side projection 6a and a panel side projection 6b which extend along the windshield glass 3 and the body panel 1, respectively. The projections 6a and 6b are so designed as to have a uniform thickness and a uniform shape along the full length of the molding.

The leg portion 5 has a height, i.e. a length between the outboard end and the inboard end, changing in correspondence with steps of the body panel 1. In the upper portion 4A, it is set to a relatively small height, and it becomes gradually longer from the midpoints of the corner portions 4B toward the side portions 4C. It is set to a relatively large constant height in the range from the upper end of each side portion 4C adjacent to the corresponding corner to the lower portion. In the side portions 4C having an enlarged height of the leg portion 5, the outboard portion of the leg portion 5 outside of the windshield glass 3 is enlarged outwardly to form a thicker extension. The thicker extension has an inner peripheral wall surface which cooperates with the glass side projection 6a of the trimming portion 6 and the outboard surface of the windshield glass 3 to define a concaved rainwater drainage groove 8 opening toward the center of the windshield glass 3. The rainwater drainage groove 8 has a depth kept constant in the longitudinal direction and a width changed in proportion to the, extensive height of the thicker extension of the leg portion.

In the windshield glass/weather strip assembly 2 formed as described above, the weather strip 4 is continuous along the peripheral edge of the windshield glass 3, assuring an esthetic appearance. The weather strip 4 extruded onto the peripheral edge of the windshield glass 3 is, at the same time, adhered to the peripheral edge of the glass 3 by an adhesive to form the unitary assembly. This is effective to eliminate the troublesome process of fitting a weather strip molded separately from the windshield glass 3 into the peripheral edge of the windshield glass 3 to make an assembly. This is also effective to prevent occurrence of "wrinkle" or "lifting" of the weather strip 4 in the corner and its vicinity of the windshield glass 3, assuring improved appearance.

Now, the description will be related to a manufacturing machine of the windshield glass/weather strip assembly 2 having the above construction with reference to FIGS. 5 to 10.

Figure 5:
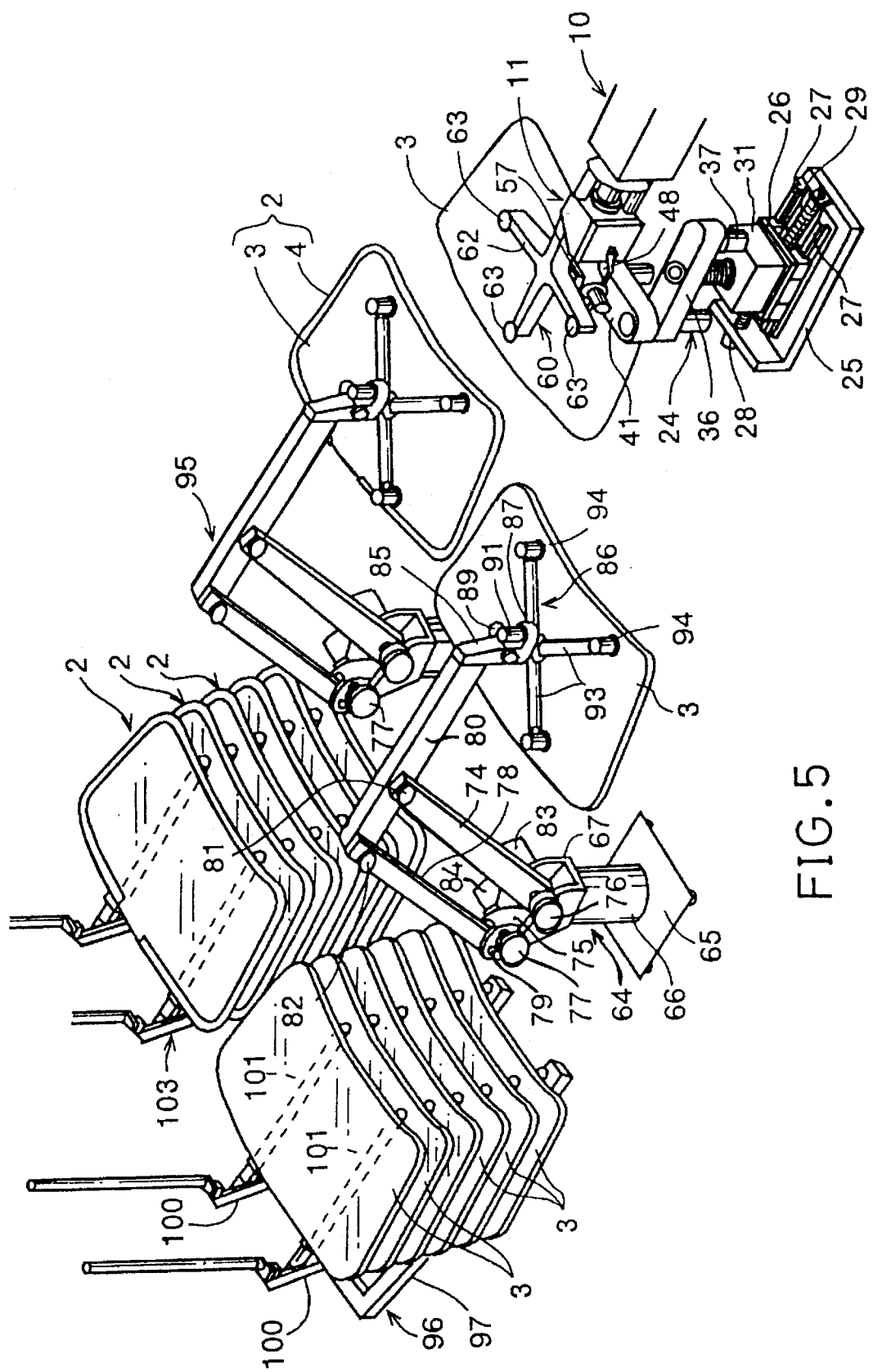
FIG. 5 is a perspective view of a whole manufacturing machine.

FIG. 5 is a perspective view of the whole manufacturing machine, which is mainly composed of a die assembly 11 to be assembled to the front end of an extruder 10, a glass holding device 60 disposed laterally of the die assembly 11, a glass introducing device 64 for the glass holding device 60, a glass ejection device 95, a glass supply shelf device 96 for the glass introducing device 64 and a glass delivery shelf device 103 for the glass ejection device 95.

Figure 6:
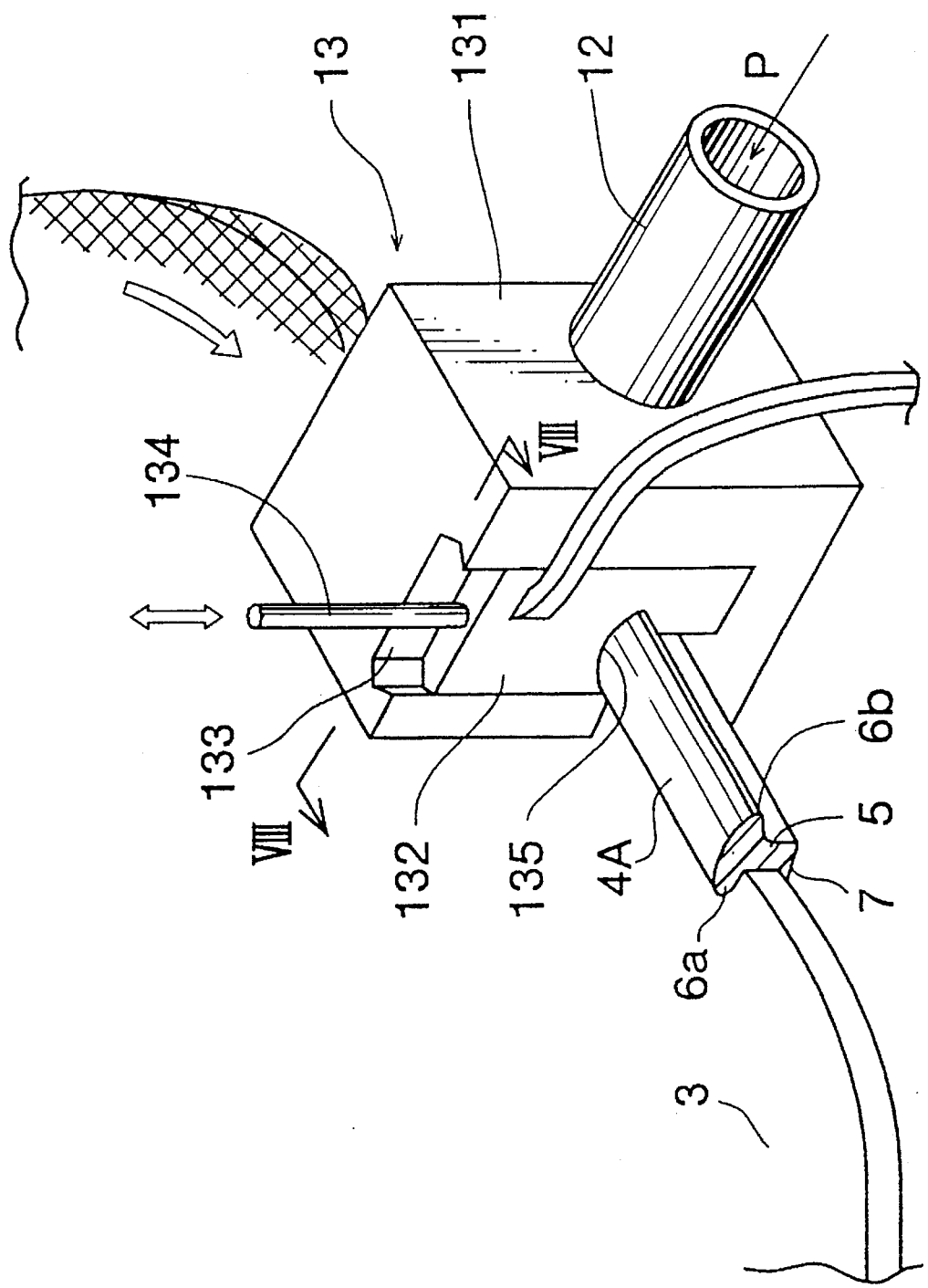
FIG. 6 is a perspective view of a die assembly.
Figure 7:
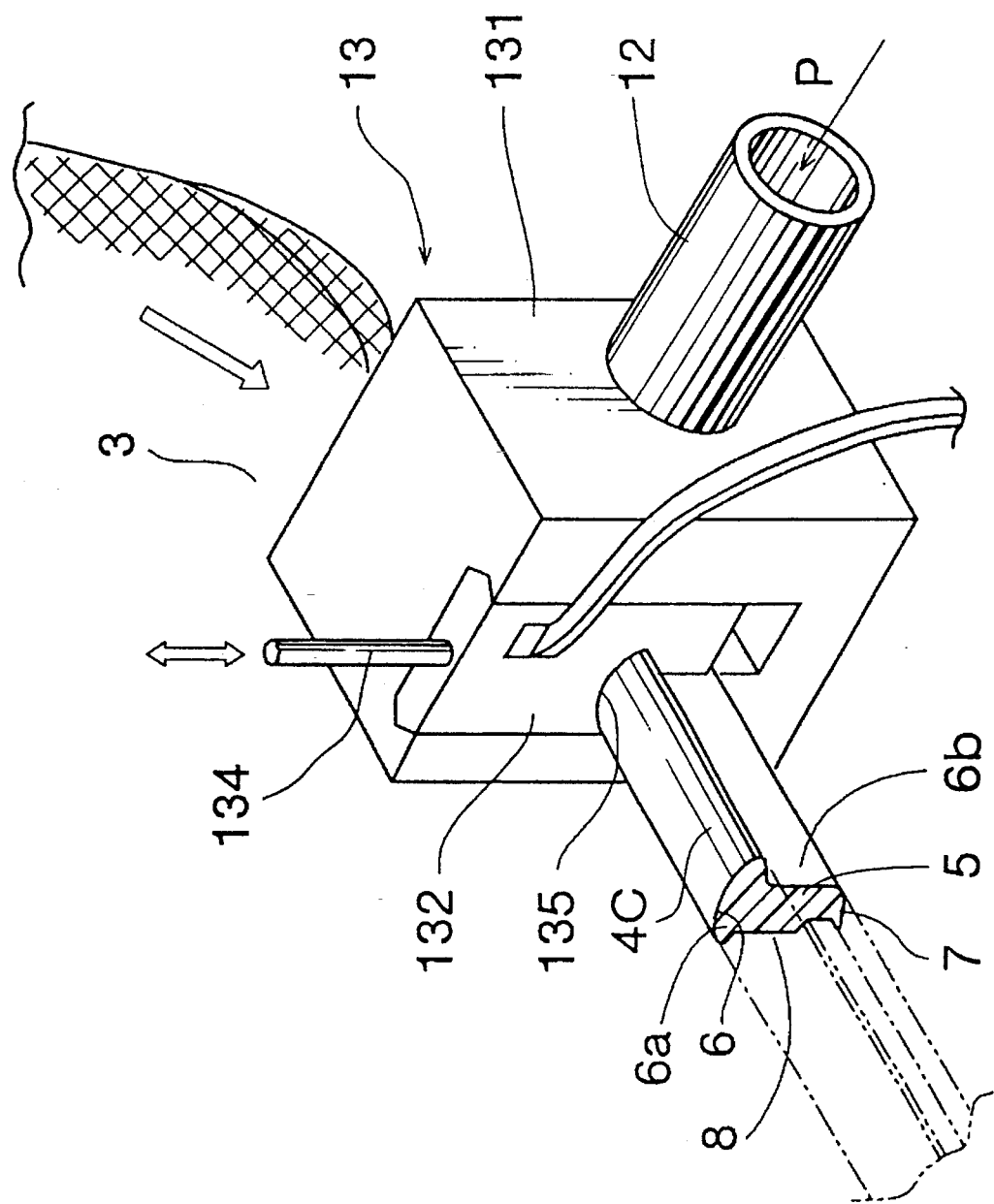
FIG. 7 is a perspective view of the die assembly in FIG. 6 wherein dies are relatively moved.

In FIGS. 6 and 7 showing the die assembly 11 of the extruder 10, a die device 13 is attached to the distal end of the extruder through a joint pipe 12 for supplying a molding resin material P. The die device 13 is provided with a fixed die 131 disposed fixedly and a movable die 132 disposed at the end of the fixed die 131 where the extruded weather strip is outputted.

The movable die 132 is vertically movably supported in a guide groove 133 provided in the fixed die 131 and is connected to a vertical drive unit not shown though a connecting rod 134 attached to the upper end of the movable die 132.

Figure 8:
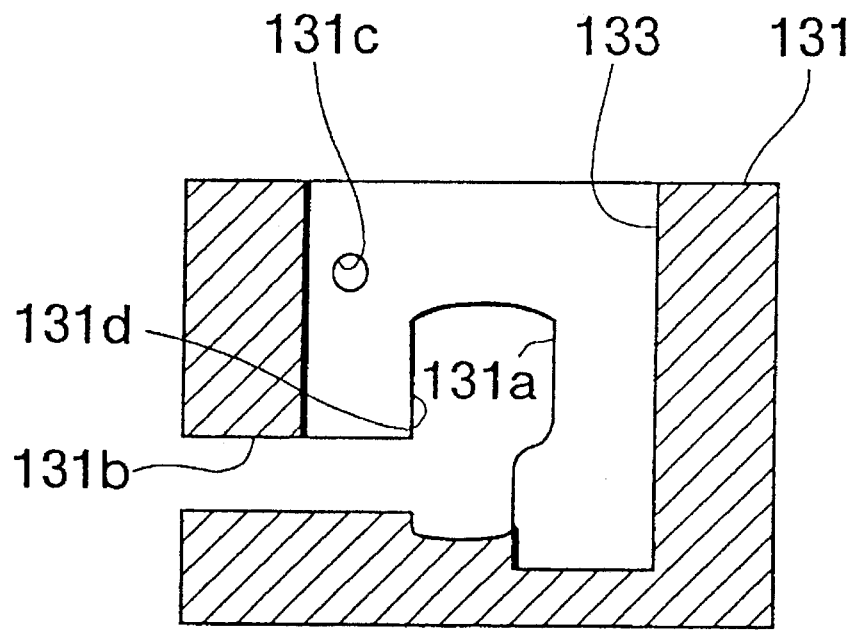
FIG. 8 is a front view of a fixed die.

As shown in FIG. 8, the fixed die 131 is formed with an orifice 131a, and a slot 131b communicates with the orifice 131a. The slot 131b is provided to receive the peripheral edge of the windshield glass 3, and with the windshield glass 3 inserted in the slot 131b, there is left a clearance in the order of 0.1 mm on each of the front and rear surfaces of the windshield glass 3. The clearance allows relative movement between the peripheral edge of the windshield glass 3 and the fixed die 131. Because of the viscosity or the like of the extrusion resin material P, the clearance in the order of 0.1 mm will cause no flowing out of the molding resin material P through the clearance. There is provided within the fixed die 131 an opening 131c communicating with the joint pipe 12, so that the molding resin material P can be extruded through the orifice 131a and the opening 131c.

Figure 9:
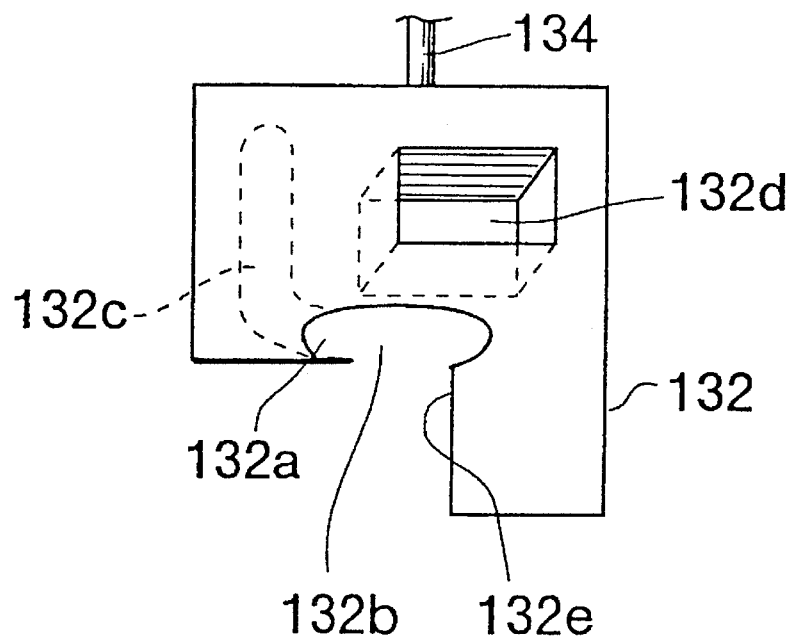
FIG. 9 is a front view of a movable die.

The movable die 132 is of a configuration as shown in FIG. 9 and has an orifice 132b having the same width as the orifice 131a of the fixed die 131 and a wider portion 132a extending therefrom to the left in the drawing. The movable die 132 has on the rear surface and in the interior thereof a supplementary passage 132c which allows communication between the opening 131c of the fixed die 131 and the wider portion 132a. The movable die 132 is also formed with a relief orifice 132d.

Figure 10:
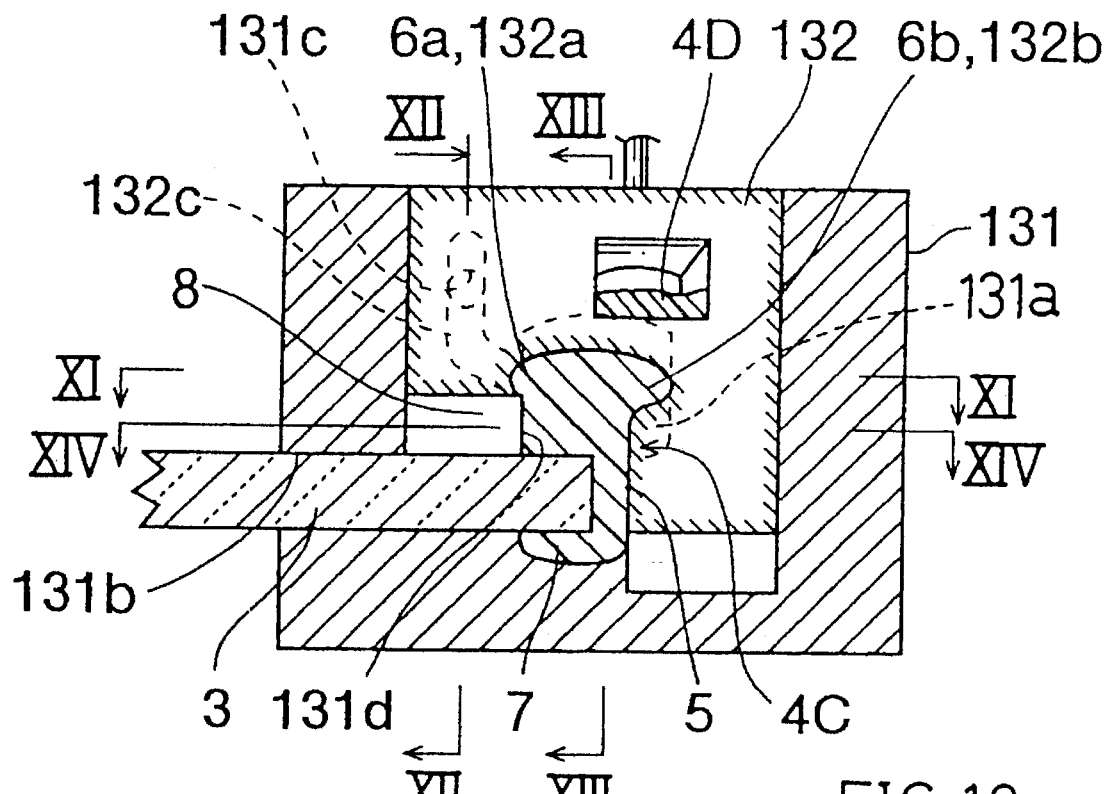
FIG. 10 is a view illustrating a positional relationship between the fixed die and the movable die.
Figure 11:
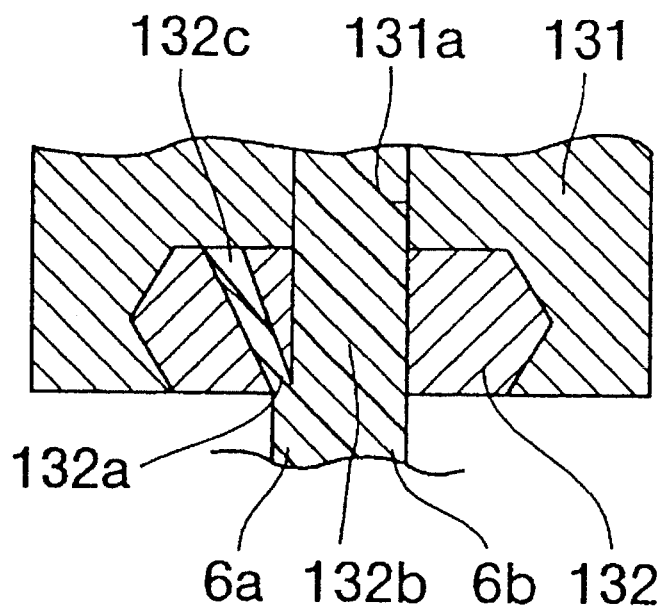
FIG. 11 is a sectional view taken along line XI—XI iH FIG. 10.
Figure 12:
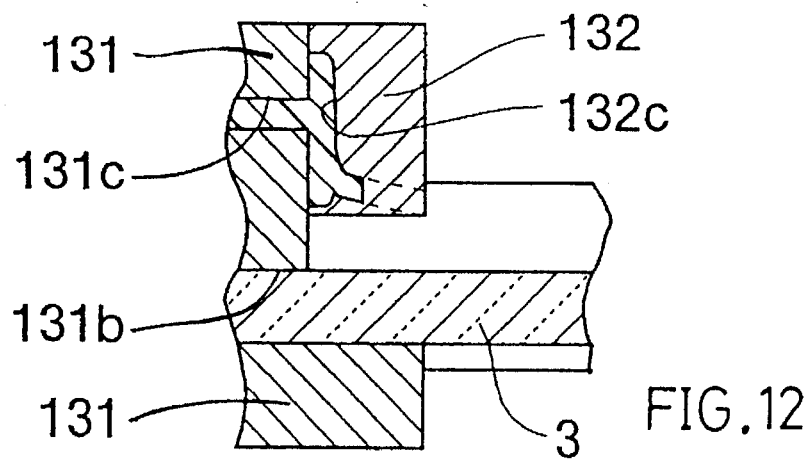
FIG. 12 is a sectional view taken along line XII—XII in FIG, 10.
Figure 13:
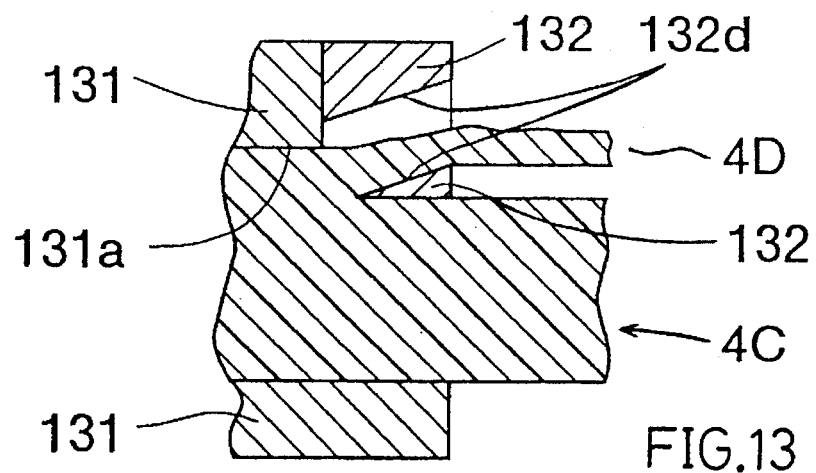
FIG. 13 is a sectional view taken along line XIII—XIII iH FIG, 10.
Figure 14:
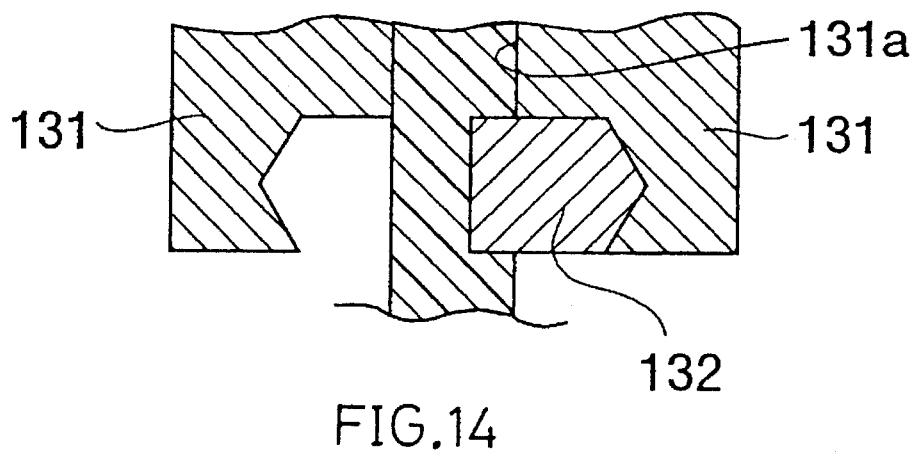
FIG. 14 is a sectional view taken along line XIV—XIV in FIG, 10.

With the movable die 132 in its uppermost position as shown in FIG. 7, the positional relationship between the movable die 132 and the fixed die 131 is shown in FIGS. 10 to 14. As shown in FIG. 10, the orifice 131a of the fixed die 131 is used to form the support piece 7. The orifice 131a of the fixed die 131 and a wall 132e (See FIG. 9) cooperates to form the leg portion 5. Further, the orifice 132b of the movable die 132 is used to form the panel-side projection 6b. The molding resin material flowing from the opening 131c of the fixed die 131 through the supplementary passage 132c into the wider portion 132a forms the glass-side projection 6a. At this time, a groove 8 is defined by a wall 131d (See FIG. 8) of the fixed die 131. Flow of the resin material from the opening 131c through the supplementary passage 132c into the wider portion 132a will be fully understood with reference to FIGS. 11 and 12.

The machine of this embodiment is so designed as to keep the resin extrusion output in the whole die device constant, even if the cross section of the weather strip is modified. The relief orifice 132d is provided for this purpose. When the movable die 132 is in its upper position as shown in FIG. 10, the leg portion 5 becomes long and, therefore the cross sectional area of the weather strip is large. At this time, the overlap area between the orifice 131a of the fixed die 131 and the relief orifice 132d of the movable die 132 is relatively small, and therefore a relatively small amount of resin 4D is extruded through the relief orifice 132d (Flow of the resin relieved into the relief orifice 132d will be fully understood with reference to FIG. 13).

Figure 15:
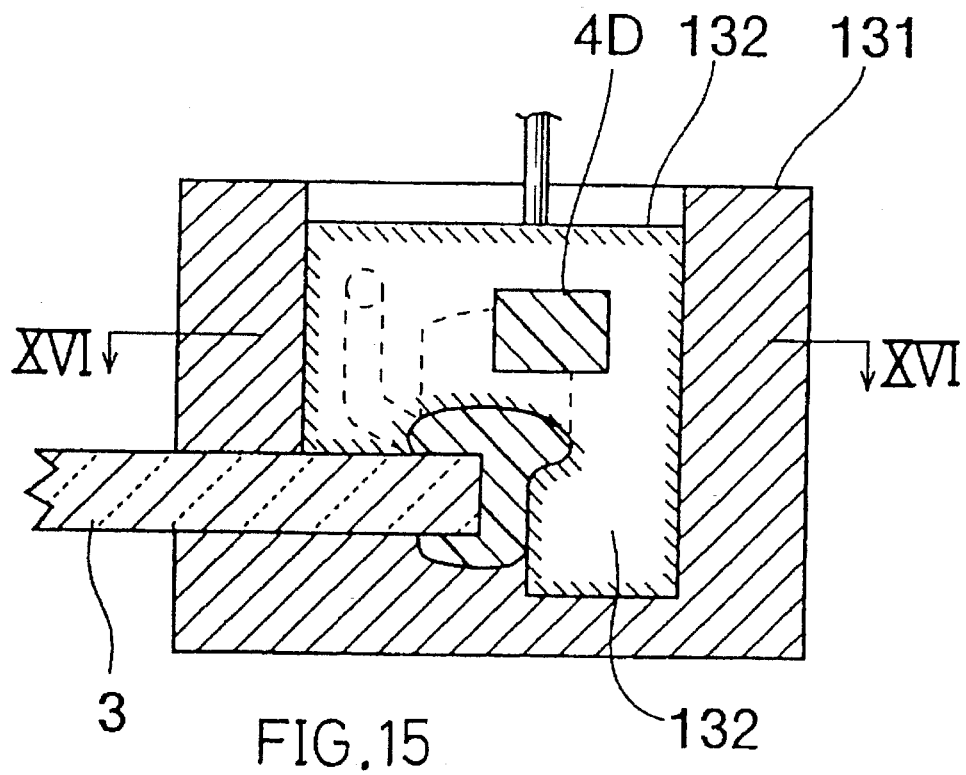
FIG. 15 is a view similar to FIG. 10 but illustrating another positional relationship.
Figure 16:
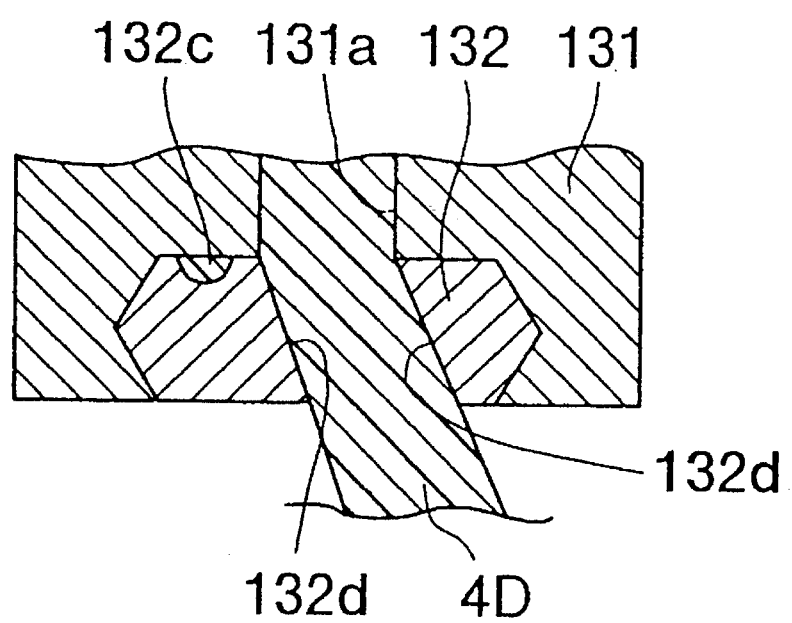
FIG. 16 is a sectional view taken along line XVI—XVI in FIG, 15.
Figure 17:
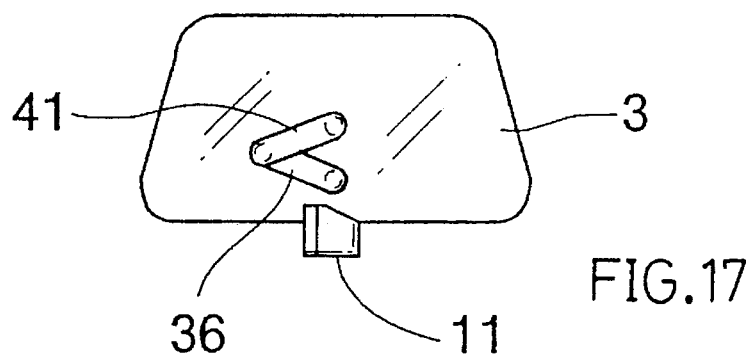
FIG. 17 is operational view illustrating the condition in which the weather strip is extruded onto the lower edge of the periphery of the windshield glass.

On the contrary, the movable die 132 in FIG. 15 is in its lower position, i.e. in the process of molding the upper portion of the weather strip as shown in FIG. 6. In this case, no groove 8 is formed, and the amount of resin relieved through the relief orifice is increased. It is apparent that there occurs no interference between the windshield glass 3 and the movable die 132.

In this embodiment, the sum of the cross sectional area of the weather strip and the cross sectional area of the resin relieved through the relief orifice 132d is always kept constant. Therefore, even if the positional relationship between the fixed die and the movable die is changed, the extrusion pressure or the like is kept constant, assuring extrusion molding of the weather strip under a uniform condition at all times.

In this case, movement of the movable die 132 is controlled so as to be synchronized with positional movement between the windshield glass 3 and the die device 13 which will be described later. Specifically, a drive unit for the movable die 132 is driven under control based upon the positional data of the windshield glass 3, which assures exact molding of the weather strip, with no misregistration, having predetermined cross sectional configurations corresponding to the respective parts of the windshield glass 3. Particularly at the corners, the corner portions 4B can be formed at high precision.

In this embodiment, the glass holding device 60 changes its position relative to the die device 13 in accordance with the data which has been taught. Thus, the weather strip 4 extruded along the edge of the windshield glass 3 can have a predetermined contour. Specifically, even if there is any fluctuation in external dimension of the windshield glass 3, the external dimension of the windshield glass/weather strip assembly 2 can be of the same dimension at all times. This allows smooth mounting on the assembly 2 to the body panel 1 and rather lowered precision requirement for the glass 3.

As shown in FIG. 5, the glass holding device 60 disposed laterally of the die assembly 11 is assembled to a transfer device 24. The transfer device 24 includes a base 25 fixed on a floor and a slide table 26 slidingly movable along a pair of rails 27 provided on the base 25. The slide table 26 is moved forwardly or rearwardly by forward or reverse rotation of a feed screw 29 driven by a slide motor 28 and threadedly engaged in a nut provided on the under surface of the slide table 26. A support member 31 is mounted on the slide table 26 and has a top plate to which is pivotally mounted a first pivot arm 36 which can be lifted or lowered by forward or reverse rotation of a lifting screw driven by a lifting motor not shown. The first pivot arm 36 can be pivotally driven by a first pivot motor 37.

A second pivot arm 41 is pivotally attached in the vicinity of the proximal end thereof to the upper surface of the first pivot arm 36 in the vicinity of the distal end thereof through sun and planet gear mechanism not shown. A rotary member 48 supports the glass holding device 60 tiltingly movably in the front-to-back and right-to-left directions through a tilting member 57 supported by shafts crossing at right angles to each other and driven by a tilting motor not shown. The glass holding device 60 is mainly composed of four holding arms 62 extending in a cruciform manner and upwardly directed suction cups 63 attached to the respective distal ends of the holding arms 62. Each of the suction cups 63 is connected to a negative pressure generator not shown. When the windshield glass 3 is placed in a registered manner on the suction cups 63, negative pressure is introduced in the suction cups 63 to suck and hold the windshield glass 3.

The glass introducing device 64 is disposed laterally of the transfer device 24 and adapted to introduce the windshield glass 3 to the glass holding device 60 mounted on the transfer device 24.

The glass introducing device 64 includes a base plate 65 fixed on the floor, a support member 66 mounted on the base plate 65, and a pivot member 67 pivotally movably attached to the upper-surface of the support member 66 through a sun and planet gear mechanism not shown. The pivot member 67 is guided by a predetermined number of guide rollers journalled by the support member 66 so as to be pivotally movable around the sun gear.

The pivot member 67 supports a long longitudinal feed arm 74 and a short lifting arm 75 which are disposed at a predetermined distance apart from each other and pivotally movable around respective drive shaft 76, 77. A follow-up arm 78 is pivotally attached at the proximal end thereof by a pin 79 to the distal end of the lifting arm 75. Further, a boom 80 is pivotally mounted on respective distal ends of the longitudinal feed arm 74 and the follow-up arm 78 by pins 81, 82, respectively. When the drive shaft 76 of the longitudinal feed arm 74 is pivotally moved by a longitudinal feed motor 83, the boom 80 is longitudinally moved forwardly and rearwardly, and when the drive shaft 77 of the lifting arm 75 is pivotally moved by lifting motor 84, the boom 80 is tilted in the vertical direction around a pin 81.

A panel suction unit 86 for releasably sucking the windshield glass 3 includes a unit body 87 attached to a mounting piece 85 fixedly secured to the distal end of the boom 80 and is tiltingly movable around a driving shaft which is driven by a tilting motor 89. A rotating shaft driven by a rotating motor 91 extends downwardly from the lower surface of the unit body 87, and four support arms 93 arranged in a cruciform manner are attached to the lower end of the rotating shaft. A suction cup 94 for releasably sucking the windshield glass 3 is attached to the lower surface of the distal end of each of the support arms 93.

Adjacent to the panel introducing device 64 is disposed the glass ejection device 95 for taking the windshield glass/weather strip assembly 2 having the weather strip 4 molded on the peripheral edge of the windshield glass 3 out of the glass holding device 60. The panel ejection device 95 is constructed in the same manner as the glass introducing device 64, and main members and parts are given corresponding reference numbers and any more description will be omitted.

Adjacent to the glass introducing device 64 is also disposed the glass supply shelf device 96 which comprise a pallet base 97 movably disposed on the floor and a pair of right and left support frames 100 projecting from the upper surface of the pallet base 97 in a rearwardly tilting manner. A plurality pairs of glass receiving arms 101 are attached to the front surfaces of the support frames 100 in vertical arrays and each pivotally movable between a horizontal position and a vertical position. Each pair of the glass receiving arms 101 are actuated by an actuator not shown between a glass receiving position, i.e. horizontal position and a waiting position, i.e. vertical position. Each pair of the glass receiving arms 101 from the lowermost one to the uppermost one is used to support a windshield glass 3 thereon so as to keep the windshield glasses 3 in layers.

The glass delivery shelf device 103 is used to keep in layers the windshield glass/weather strip assemblies 2 ejected from the glass holding device 60 by the glass ejection device 95, and it is constructed the same manner as the glass supply shelf device 96, and main members and parts are given corresponding reference numbers, and any more description will be omitted.

Now, the description will be related to the operation of the manufacturing machine and the manufacturing method in accordance with the present invention.

PRETREATMENT PROCESS

The windshield glass 3 is preliminarily primer-treated at the end surface and front and rear surfaces in the peripheral edge, and then a resin adhesive is applied onto the primer-treated portions. As described above, the pretreated windshield glasses 3 are placed in layers on respective pairs of glass receiving arms 101 of the glass supply shelf device 96. Then, the glass supply shelf device 96 is moved to a glass supply position.

GLASS INTRODUCING PROCESS

When the glass supply shelf device 96 is moved to the glass supply position, the glass introducing device 64 is activated. When the pivot member 67 is pivotally moved to direct the boom 80 toward the glass supply shelf device 96, the boom 80 is advanced toward the windshield glass 3 in the uppermost layer in the glass supply shelf device 96 and tilted downwardly. At this time, the arms 93 are tilted in a direction opposite to the tilting direction of the boom 80 so as to keep the arms 93 in the horizontal position.

The advance and downward tilting of the boom 80 causes each suction cup 94 of the glass suction unit 86 to be brought in abutment against the upper surface of the uppermost windshield glass 3, and then, negative pressure is introduced into the suction cups 94 to suck the windshield glass 3 by the suction cups 94. After the windshield glass 3 is sucked by the suction cups 94, the boom 80 is retracted and upwardly tilted, with the arms 93 of the panel suction unit 86 kept in the horizontal position. Thus, the windshield glass 3 can be suspended in the horizontal position.

Then, the boom 80 is pivotally moved toward the glass holding device 60 and advanced and downwardly tilted toward the holding arms 62 in the glass holding device 60. At this time, the windshield glass 3 sucked by the panel suction unit 86 is set to be in a predetermined orientation with respect to the holding arms 62 in the glass holding device 60, and in this embodiment, the lower edge portion of the periphery of the windshield glass 3 is directed in opposition to the die assembly 11. Then, the windshield glass 3 is placed on the suction cups 63 provided on the holding arms 62 in the glass holding device 60.

When the windshield glass 3 is placed on the suction cups 63 in the glass holding device 60, negative pressure is introduced the suction cups 63, while the pressure in the suction cups 94 of the glass introducing device 64 is released to an atmospheric pressure. Thus, the windshield glass 3 is sucked by the suction cups 63 in the glass holding device 60, completing the introduction of the windshield glass 3 into the glass holding device 60. Then, the glass introducing device 64 is operated to receive a next windshield glass 3 in the glass supply shelf device 96 and then stopped in the waiting position, as shown in FIG. 5.

EXTRUSION MOLDING PROCESS

If the windshield glass 3 sucked by the suction cups 63 in the glass holding device 60 has a curved glass surface, the holding arms 62 in the glass holding device 60 and the windshield glass 3 are tilted by the tilting member 57, so that the lower edge portion of the periphery of the windshield glass 3 facing the lateral slot of the die assembly 11 can be kept horizontal. Furthermore, the transfer device 24 is vertically moved so as to position the lower edge portion of the periphery of the windshield glass 3 at a level corresponding to the lateral slot 131b of the die assembly 11.

Then, the slide table 26 is advanced, so that a substantially central portion of the lower edge portion of the windshield glass 3 is inserted through the lateral slot 131b of the die assembly 11 into the orifice 131a by a predetermined amount. At this time, the movable die 132 of the die assembly 11 is set to the position as shown in FIGS. 7 and 10, wherein the area of the orifice is practically largest. As described above, when the windshield glass 3 is inserted into the orifice, a molding space corresponding to the cross sectional configuration of the weather strip 4 is defined between the peripheral edge of the windshield glass 3 and the inner peripheral wall of the orifice. Then, the molding resin material P is supplied into the molding space thus defined through a feed passage in the die assembly 11 and finally extruded from the extrusion orifice.

As the molding resin material P is extruded from the extrusion orifice, the first and second arms 36 and 41 are pivotally moved in predetermined directions, respectively, so that the weather strip can be gradually extruded along the peripheral edge of the windshield glass 3 from the central portion of the lower edge toward the first corner at a controlled speed.

Figure 18:
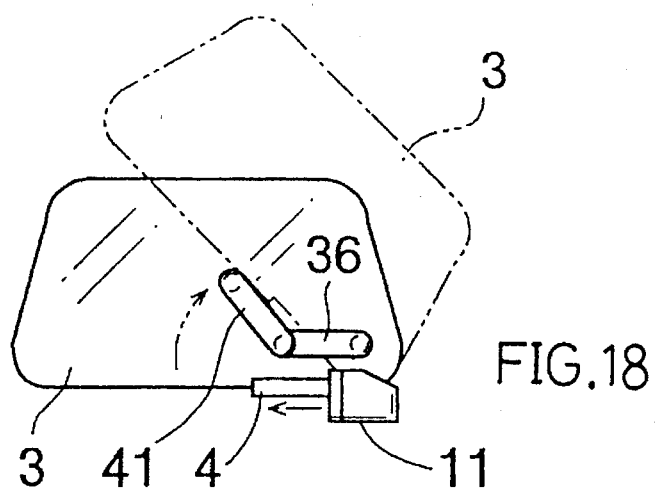
FIG. 18 is another operational view illustrating the condition in which the weather strip is extruded onto a first corner of the periphery of the windshield glass.

When the first corner of the peripheral edge of the windshield glass 3 reaches the extrusion orifice of the die assembly 11, as shown in FIG. 18, the rotary member 48 is pivotally moved synchronously with the pivotal movement of the first and second pivot arms 36 and 41, so that the die assembly 11 may be relatively moved along the rounded surface of the first corner of the windshield glass 3. As the tilting member 57 is tilted in correspondence with the curvature of the glass surface at the first corner, the first corner of the windshield glass 3 can be kept horizontal in relation to the extrusion orifice of the die assembly 11.

Figure 19:
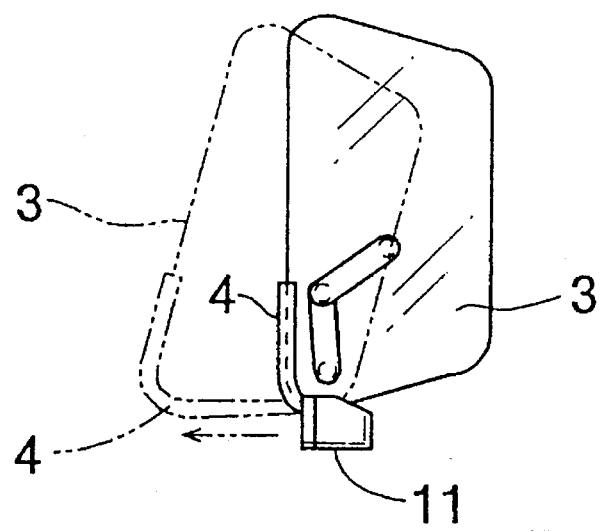
FIG. 19 is a further operational view illustrating the condition in which the weather strip is extruded onto the right side edge of the periphery of the windshield glass.
Figure 21:
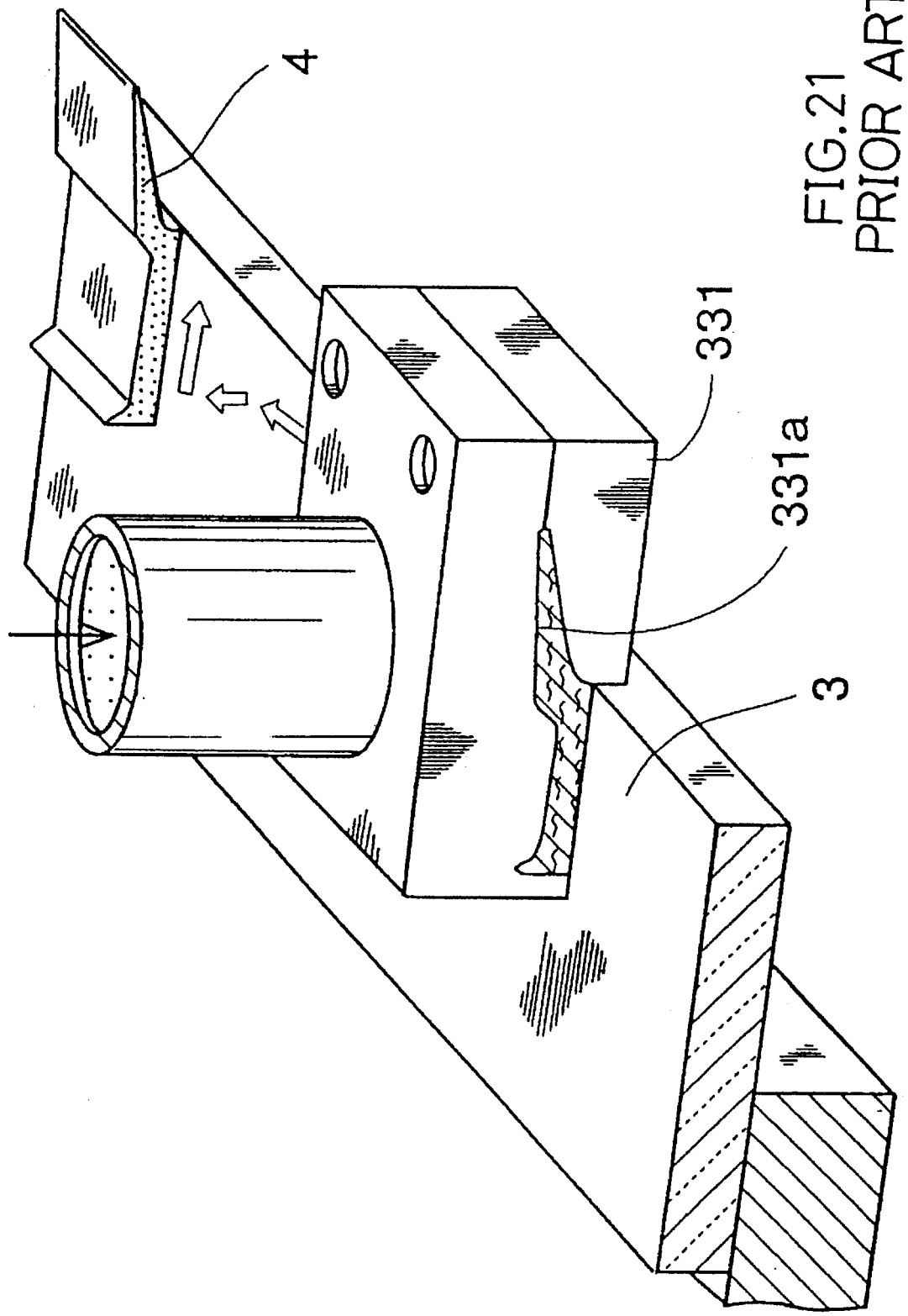
FIG. 21 is a view illustrating another prior art.
Figure 22:
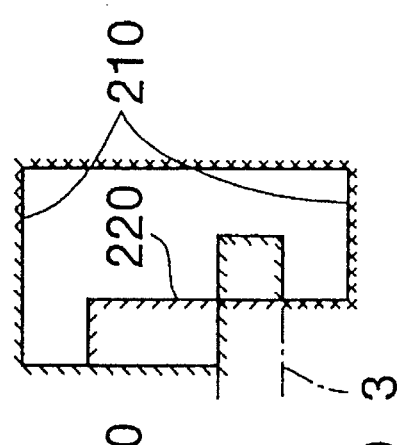
FIGS. 22(A1), 22(A2), 22(B1), 22(B2), 22(C1), 22(C2) and 22(D2) are schematic views illustrating the prior art and a problem incorporated therein.
Figure 22:
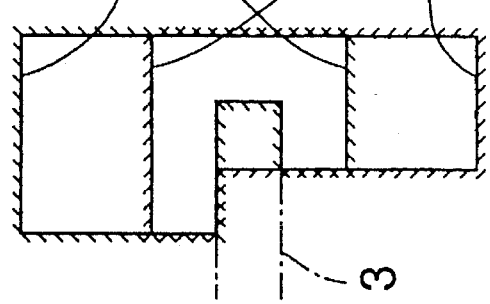
Figure 22:
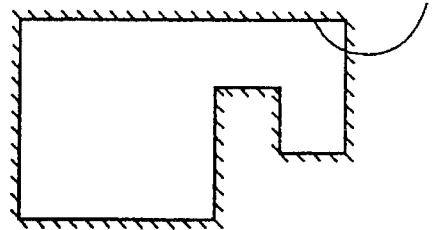
Figure 22:
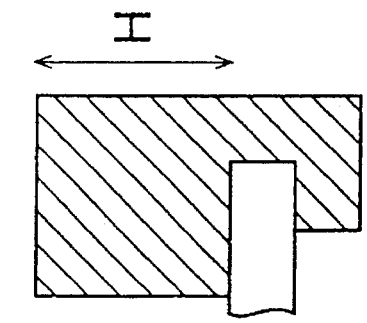
Figure 22:
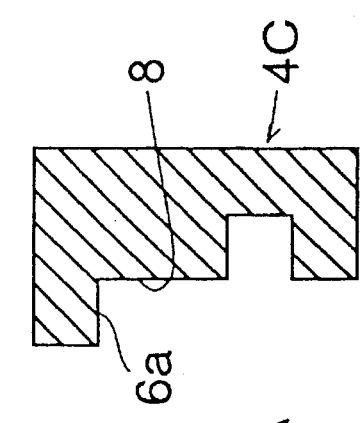
Figure 22:
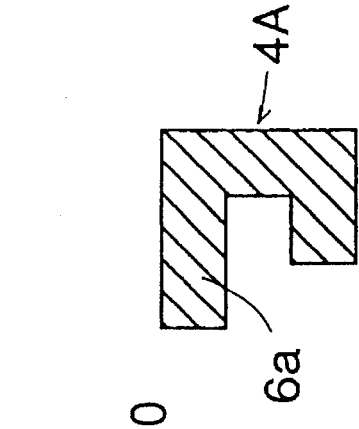
Figure 22:
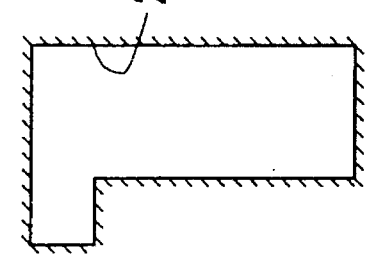

When the first corner of the windshield glass 3 has passed through the extrusion orifice of the die assembly 11 and the right side edge portion of the windshield glass 3 reaches the extrusion orifice, as shown in FIG. 19, the tilting member 57 is tilted in correspondence with the curvature of the windshield glass 3 at the right side edge, keeping the right side edge of the windshield glass 3 horizontal in relation to the extrusion orifice, while the right side edge of the windshield glass 3 is moved by the first and second pivot arms 36 and 41. Thus, the side portion 4C is molded on the right side edge of the windshield glass 3.

In the side portion from the upper portion of the right side edge to the second corner of the peripheral edge of the windshield glass 3, extrusion is carried out with the movable die 132 of the die assembly 11 moving from the position in FIG. 7 to the position in FIG. 6, so that the thick extension of the weather strip 4 is gradually reduced in the corner portion 4B. In this case, the movement of the movable die 132 is controlled so as to be synchronous with the relative movement between the windshield glass 3 and the die assembly 11, as described above. Therefore, the weather strip can be exactly molded with no misregistration so as to have predetermined cross sectional configurations corresponding to the respective parts of the windshield glass 3, and particularly at the corner and in the vicinity thereof, the thicker extension of the leg portion 5 in the corner portion 4B can be gradually reduced with high positional precision.

When extrusion molding of the corner portion 4B is completed and the upper edge portion of the windshield glass 3 reaches the extrusion orifice, extrusion molding of the upper portion 4A is started. In this case, the movable die 132 of the die assembly 11 is set at the position in FIG. 6, with the extrusion orifice having its minimum opening area.

Thus, the peripheral edge of the windshield glass 3 held by the glass holding device 60, which is kept horizontal by the transfer device 24, is inserted and moved in the extrusion orifice of the die assembly 11, the depth of insertion being kept constant at all times. At this time, as the movement of the movable die 132 of the die assembly 11 is controlled so as to be synchronous with the relative movement between the windshield glass 3 and the die assembly 11, extrusion molding can be carried out, with the contour of the extrusion orifice being varied in correspondence with the parts of the glass. Thus, the weather strip 4 having a partly modified cross section can be precisely molded on the peripheral edge of the windshield glass 3 with no misregistration, and at the same time, it is fixedly adhered to the peripheral edge of the windshield glass by the adhesive applied thereon. When the full length of the weather strip 4 has been extruded along the peripheral edge of the windshield glass 3, supply of the molding resin material P to the feed passage in the die assembly 11 is shut off.

EJECTION PROCESS

After supply of the molding material is shut off, the slide table 26 is retracted to its original position. The windshield glass/weather strip assembly 2 is extracted from the lateral slot of the extrusion outlet. Thereafter, the windshield glass/ weather strip assembly 2 is conveyed by the glass ejection device 95 onto a pair of glass receiving arms 101 in the glass delivery shelf device 103.

According to the present invention, the windshield glass/ weather strip assembly 2 as shown diagrammatically in FIGS. 23(B2) and 23(C2) can be formed. The orifices of the fixed die and the movable die may be modified so as to form the weather strip as shown diagrammatically in FIGS. 24(B2) and 24(C2). The weather strip 4 thus formed has a lip 6c facing the outboard side thereof. The 6c includes a thinner upper portion and a thicker side portion. The thicker side portion is formed with a groove 8 extending toward the center of the windshield glass 3.

As described above, in accordance with the present invention, as extrusion molding is carried out, the movable die of the die assembly is properly moved to change the shape of the extrusion outlet and thereby to mold a weather strip having a partly modified cross section, and at the same time, the weather strip is fixedly adhered to the peripheral edge of the windshield glass, so that the weather strip having a partly modified cross section can be easily and exactly fitted onto the peripheral edge of the windshield glass with no misregistration, that is, the upper portion and the side portion of the weather strip can be exactly positioned on the upper edge and the side edge of the windshield glass, respectively, assuring improvement of the appearance of the weather strip. Furthermore, as the movable die is provided with the wide orifice and the supplementary passage communicating therewith, the weather strip having the groove formed in some parts thereof can be integrally molded along the peripheral edge of the windshield glass.

What is claimed is:

1. An assembly of a windshield glass and a weather strip, the windshield glass having a periphery and a central portion, said periphery including an upper windshield glass edge and opposed side windshield glass edges, the weather strip being extruded onto the periphery of the windshield glass and having different cross sections at the upper edge of the windshield glass and at the opposed side edges of the windshield glass, the extruded weather strip having the cross section at the upper edge of the windshield glass in substantial registration with the upper windshield glass edge and having the different cross section at the opposed side edges of the windshield glass in substantial registration with the opposed side windshield glass edges, the weather strip including a projection extending toward the center of the windshield glass at the outboard side thereof, wherein the projection is in contact with the windshield glass at the upper edge of the windshield glass, and wherein the projection is apart from the windshield glass at the side edges of the windshield glass and defines a groove between the windshield glass and the projection.

2. The assembly as defined in claim 1, wherein a space between the projection and the windshield glass to define the groove is continuously changed at a corner connecting the upper edge and the side edge of the windshield glass.

3. An assembly of a windshield glass and a weather strip, the windshield glass having a periphery and a central portion, said periphery including an upper windshield glass edge and opposed side windshield glass edges, the weather strip being extruded onto the periphery of the windshield glass and having different cross sections at the upper edge of the windshield glass and at the opposed side edges of the windshield glass, the extruded weather strip having the cross section at the upper edge of the windshield glass in substantial registration with the upper windshield glass edge and having the different cross section at the opposed side edges of the windshield glass in substantial registration with the opposed side windshield glass edges, the weather strip including a lip extending toward the center of the windshield glass at the outboard side thereof and being in tight contact with the surface of the windshield glass at the upper edge and the side edges of the windshield glass, wherein the lip is relatively thin at the upper edge of the windshield glass and is relatively thick at the side edges of the windshield glass, the relatively thick portions of the lip defining a groove extending and opening toward the center of the windshield glass.

4. An assembly comprising a preformed windshield glass having a periphery and a central portion, said periphery including an upper windshield glass edge and opposed side windshield glass edges, and a weather strip progressively in situ extrusion molded on said periphery and integrally adhered thereto, said weather strip having a longitudinal extent of varying cross-section which is defined as the weather strip is extrusion molded to the periphery of the windshield glass, said weather strip including a projection, along the longitudinal extent thereof, extending toward the center of the windshield glass at the outboard side thereof, the projection being in contact with the windshield glass at said upper edge of the windshield glass, said projection being spaced from the windshield glass at the opposed side edges of the windshield glass and defining a groove between the windshield glass and the projection, and the in situ extrusion molded weather strip having the projection in contact with the windshield glass in substantial registration with the upper windshield glass edge and having the projection spaced from the windshield glass in substantial registration with the opposed side edges of the windshield glass.

5. The assembly of claim 4 wherein spacing of the projection from the windshield glass to define said groove therebetween is continuously varying at a corner defined between said upper windshield glass edge and each said side windshield glass edge.

6. An assembly comprising a preformed windshield glass having a periphery and a central portion, said periphery including an upper windshield glass edge and opposed side windshield glass edges, and a weather strip progressively in situ extrusion molded on said periphery and integrally adhered thereto, said weather strip having a longitudinal extent of varying cross-section defined as the weather strip is extrusion molded to the periphery of the windshield glass, said weather strip including a projecting lip, along the longitudinal extent thereof, extending toward the center of the windshield glass at the outboard side thereof and being in tight contact with the surface of the windshield glass at the upper edge and the side edges of the windshield glass, the lip being relatively thin along a first portion of the longitudinal extent thereof at the upper edge of the windshield glass and relatively thick along second portions of the longitudinal extent thereof at the side edges of the windshield glass, the in situ extrusion molded weather strip having the first relatively thin portion of the extent of the lip in tight contact with the windshield glass in substantial registration with the upper windshield glass edge and having the second relatively thick portion of the extent of the lip in tight contact with the windshield glass in substantial registration with the side edges of the windshield glass, and the relatively thick portions of the lip defining a groove extending and opening toward the center of the windshield glass.

\* \* \* \* \*